United States Patent [19]
Altseimer

[11] 3,745,664
[45] July 17, 1973

[54] TEMPLET FOR ELECTRICAL BOXES

[76] Inventor: Lukas G. Altseimer, 902 Cedar Ln., Trenton, Pa. 08610

[22] Filed: July 2, 1971

[21] Appl. No.: 159,353

[52] U.S. Cl............. 33/174 G, 33/DIG. 10, 33/197
[51] Int. Cl. ......................... B25h 7/04, G01b 3/14
[58] Field of Search............. 33/1 G, 174 G, 174 B, 33/174 H, 180, 197, DIG. 10, 189

[56] References Cited
UNITED STATES PATENTS

| | | | |
|---|---|---|---|
| 2,898,688 | 8/1959 | Cottar | 33/197 |
| 2,775,812 | 1/1957 | Mohr | 33/174 G |
| 2,990,172 | 6/1961 | Gianotta | 33/DIG. 10 |
| 2,887,776 | 5/1959 | Eisner | 33/174 G |

Primary Examiner—Robert B. Hull
Assistant Examiner—Richard R. Stearns
Attorney—Frederick J. Olsson

[57] ABSTRACT

A stamp mounted on a relatively rigid support to which are attached flexible legs which provide for the stamp to be frictionally held on an electrical box so that the stamp can be contacted by the blind side of a panel. Upon contact the stamp prints guide lines on the panel corresponding to the shape of the box.

3 Claims, 6 Drawing Figures

INVENTOR.
LUKAS G. ALTSEIMER
BY
FREDERICK J. OLSSON
ATTORNEY.

INVENTOR.
LUKAS G. ALTSEIMER
BY
FREDERICK J. OLSSON
ATTORNEY.

TEMPLET FOR ELECTRICAL BOXES

This invention relates to a templet for use in marking the location of electrical box access holes during the installation of wall panels and the like.

More specifically, the invention relates to a templet insertable into an electrical wall box and in such position is operable to print guide lines on the blind side of a panel which is pressed against the templet, the guide lines being used in cutting an access hole in the panel to accomodate the box when the panel is permanently attached to the wall. The templet includes a stamp which effects the actual printing.

In operation the templet is placed in the box with the stamp facing outwardly. Then the bottom of a panel is positioned against the wall and tilted toward the wall until the blind side firmly contacts and is pressed against the stamp. The stamp prints the required outline. The panel is removed and the guide lines used in cutting the access hole to accomodate the box.

One object of the invention is to provide a templet for electrical boxes which prints access hole guide lines on the blind side of a panel.

Another object of the invention is to provide a templet for electrical boxes which not only prints access hole guide lines on the blind side of a panel but which is usable without modification on both conventional switch and outlet boxes and with nail-on boxes for switches and outlets.

Another object of the invention is to provide a templet for electrical boxes which prints access hole guide lines on the blind side of a panel and which can be used without modification or adjustment with conventional switch and receptacle boxes whether or not the switch or receptacle is mounted in the box.

Another object of the invention is to provide a templet for electrical boxes which prints guide lines on the blind side of a panel, the guide lines accurately determining the location of box access holes.

Another object of the invention is to provide a templet for electrical boxes which can be used for making access hole guide lines for both single and multiple unit boxes.

Another object of the invention is to provide a templet of the kind in question which is inexpensive to manufacture, which is very easy for the mechanic or carpenter to use and which is positive and reliable in operation.

The invention will be described below in connection with the following drawings wherein.

Figure 1:
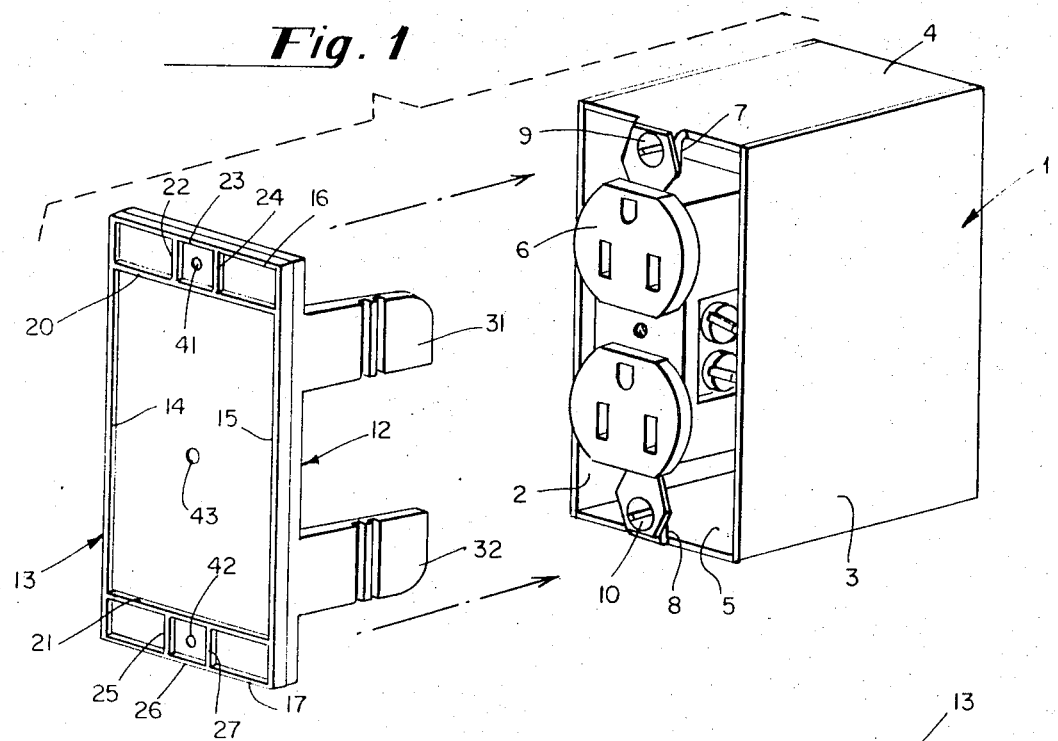
FIG. 1 is an exploded perspective view showing a templet constructed in accordance with the invention about to be inserted into a conventional outlet box.

In FIG. 1 the hollow conventional electrical outlet box 1 has sides 2 and 3 and top 4 and bottom 5. The receptacle 6 is mounted on the depending ears 7 and 8 by means of the screws 9 and 10.

For sake of clarity I have not shown the bracket or other means for securing the box to the wall studs as such means are conventional.

The templet 12 includes a stamp 13 configured to print an outline corresponding to the outer edges of the conventional electrical boxes which are elongated and generally rectangular in shape. The outline is slightly larger than the box outline in order to provide adequate tolerance. The stamp 13 is preferably formed of the same material as is used for the conventional "rubber" stamp and when wet with appropriate printing material and pressed on a surface will print the desired configuration or outline.

Conventional items such as blue carpenter's chalk a bingo pencil or a stamp pad can be used for wetting the stamp.

In FIG. 1 the parts 14 and 15 correspond to the outer edges of the walls 2 and 3 and the parts 16 and 17 correspond to the outer edges of the top 4 and bottom 5.

When the printout is for a conventional switch box the parts 20 and 21 correspond to the outer edges of the top and bottom of the box while the parts 15 and 16 correspond to the outer edges of the walls. Since the outer edge of a conventional switch box includes the upstanding ears (which accomodate fastening of the switch) the stamp prints an outline to correspond to the ears, for example, the parts 22, 23 and 24 on the top and parts 25, 26 and 27 on the bottom respectively correspond to the top and bottom ears.

The stamp is preferably mounted on a flat backing member 30 which provides rigidity or support so that when the blind side of a panel is pressed on the stamp it will make the required print. The backing member conforms substantially to the rectangular shape of the box.

Figure 2:
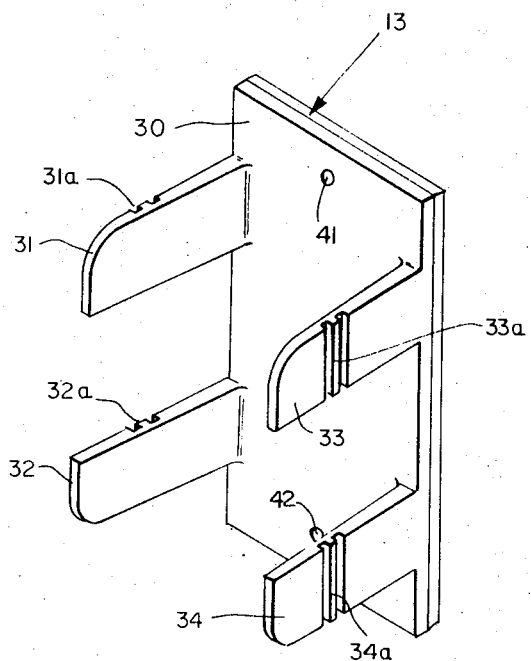
FIG. 2 is a perspective view of the templet of FIG. 1 taken from the back side.

The means for retaining the templet in the box for the printing operation preferably comprises a plurality of flexible legs 31, 32, 33 and 34 as is best shown in FIG. 2. The legs extend outwardly generally normal to the plane of the backing member are configured and oriented so that the opposite pairs 31–33 and 32–34 must be pressed toward one another to be insertable in the box. For example, the bottom legs 32–34 can be pressed toward one another (using forefinger and thumb) then with the templet slightly tilted the bottom legs are inserted into the box. The bottom legs are released and the top legs 31–33 are then pressed toward one another and the top of the templet moved so that the top legs enter the box. The templet is pushed inwardly until the support 30 contacts the outer face of the receptacle 6.

The legs engage the inner surfaces of the side walls and being yieldable or flexible exert a pressure on the walls which is sufficient to secure the templet in position for the printing operation. The engagement between the walls and the legs is frictional so that the templet is capable of some shifting or sliding movement as such is necessary to accomodate panel movement.

The length of the legs 31–34 is selected so that the legs can perform their intended function of retaining the templet in the box even though the particular box may contain an electrical switch.

Figure 3:
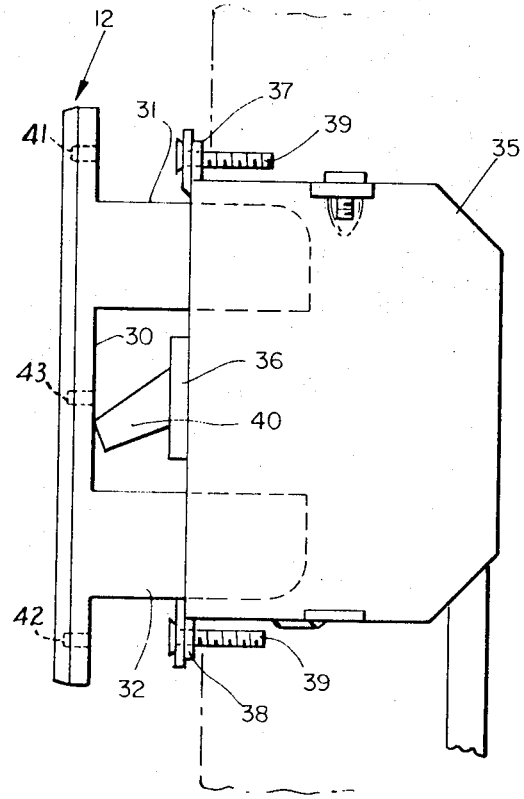
FIG. 3 is a side elevational view showing a templet constructed in accordance with the invention as inserted into a conventional switch box with the switch being in position.

For example, in FIG. 3 the conventional electrical switch box 35 has a switch 36 which is mounted on the outwardly extending ears 37, and 38 and secured in place by screws 39. The toggle 40 of the switch extends substantially outwardly. When the templet 12 is placed in the box, the support 30 will engage the toggle. The legs of the templet extend far enough into the box so that the templet is held correctly for the printing operation.

The support 30 and legs 31–34 are preferably integral and molded from plastic, however it will be understood that other materials capable of performing the intended functions may be used.

In the foregoing I have described the use of the templet in connection with the conventional electrical receptacle and switch boxes having these such electrical components mounted therein. It will be apparent from the description however, that the templet can be used exactly as described under conditions where a switch or a receptacle is not mounted in a box.

The templet as described above is dimensioned for use with single size switch and receptacle boxes. It will be understood that templets can be specifically sized for double or triple size boxes. However, in connection with double and triple size boxes, the invention contemplates the use of the single size templet. For such purposes the stamp 13 and support 30 are provided with top hole 41, bottom hole 42 and center hole 43 which accomodate attaching screws. The holes 41 and 42 are located so as to correspond with the threaded holes in the depending ears (7 & 8) of a receptacle box and to the threaded holes in the projecting ears (37 & 38) of a switch box. The middle hole 43 is located to correspond to the screw hole in the center of a receptacle.

When the multi-size box does not contain a switch or a receptacle, the templet is secured by one or more screws on one side of the box and the guide lines printed. The templet is then removed and pressed on the back of the panel adjacent the printed guide lines to complete the outline for the double box (or printed twice for a triple box). Obviously the second printing should slightly overlap on the side of the first printing so as to take into account the over-size of the guide lines.

When the multi-size box has receptacles or switches therein the templet can be attached by removing one or both of the screws on one side of the box.

Figure 5:
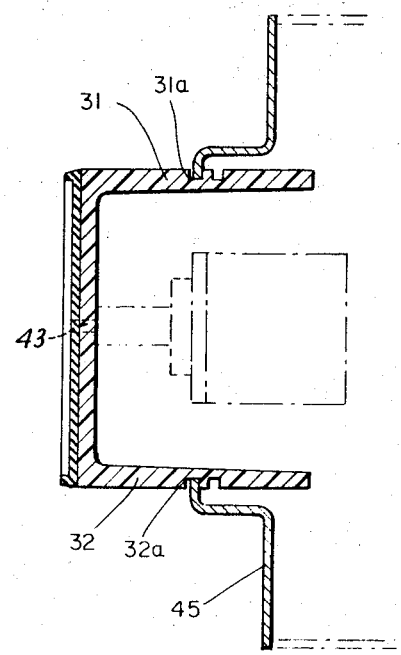
FIG. 5 is a plan view taken along lines 5—5 of FIG. 4.
Figure 6:
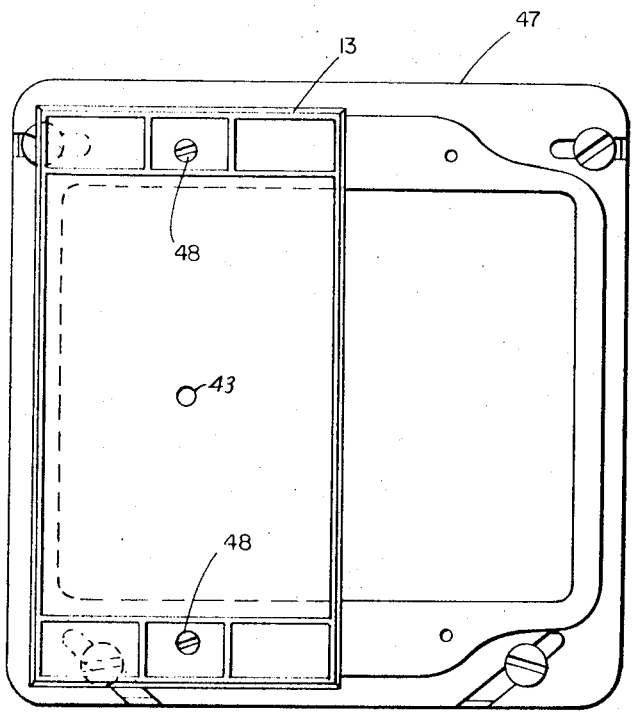
FIG. 6 is a front elevational view showing the templet of the invention as mounted in a double size nail-on type box.

The templet as described is useful not only with conventional switch and receptacle boxes but also can be used with conventional nail-on type boxes. Typical examples of the foregoing are shown in FIGS. 4, 5 and 6.

Figure 4:
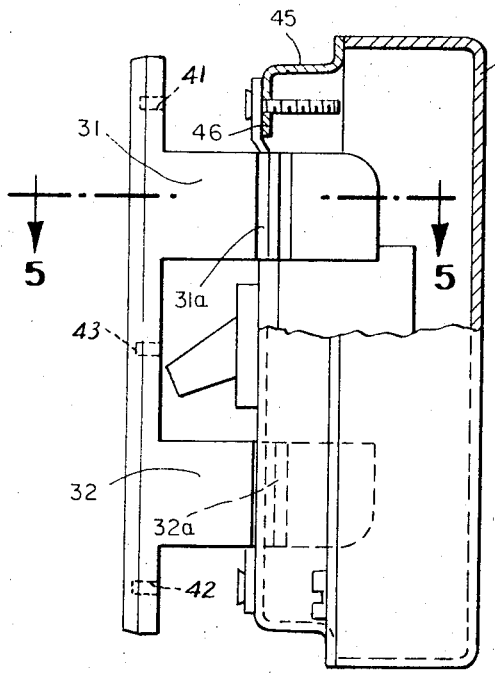
FIG. 4 is a side elevational view showing a templet constructed in accordance with the invention as used in a conventional nail-on type box with the switch in position.

Thus in FIG. 4 the nail-on box 44 has a lid 45 forming an opening 46 which provides access to the interior of the box. In the conventional nail-on box the walls are spaced considerably outwardly from the periphery of the access hole. To accomodate this condition the legs of the templet are provided with slots on the outside surfaces, for example, the slots 31a, 32a, 33a and 34a which engage the inner periphery of the access opening in the lid and secure the templet on the box. The legs 31-34 are oriented so that the opposite pairs must be pressed together in order to set up the templet with the slots engaging the inner periphery of the access openings. In this way the legs exert an outward pressure which assist the slots in securing the templet on the box for the printing operation.

In the case of a double size nail-on box 47 (FIG. 6) the templet holes 41 and 42 can receiVe screws 48 for securing the templet to the box for the initial printing and then repeat printing can be made on the panel similarly as described above.

I claim:

1. A templet of the kind described for use with an elongated, rectangular shaped electrical box having a pair of opposite longitudinal sides which are adapted to be vertically oriented, the templet comprising:

a stamp configured so that when the blind side of a panel is pressed against the stamp it prints an outline corresponding to the outer edge of said electrical box and the stamp being constructed to retain marking material on the surface thereof, the marking material being for use in making said print;

a generally flat backing member conforming substantially to the rectangular shape of the face of said box and holding the stamp and providing support for the stamp when said blind side is pressed against the stamp so that the same makes said print; and a first pair of flexible legs connected to and extending substantially normally to the plane of said backing member from one longitudinal side of the backing member and a second pair of flexible legs connected to and extending substantially normally to the plane of said backing member from the opposite longitudinal side of the backing member, the legs being constructed for insertion into said electrical box and thereupon to respectively slideably engage said opposite longitudinal sides of the box and exert pressure thereon sufficient for securing the templet on the box for said printing operation, the sliding engagement of the legs providing for the templet to tilt when the stamp is engaged by said blind side and the legs and the sliding engagement providing for positioning the templet with respect to the outer edge of the box so that the templet is mountable with or without a switch or an outlet in the box.

2. A construction in accordance with claim 1 wherein said stamp is configured to make an additional print which corresponds to the ears of an electrical switch box.

3. A construction in accordance with claim 1 further including a plurality of holes formed in said backing member and being located to provide for the templet to be fixed to an electrical box by one or more screws operating through one or more of the holes.

* * * * *